April 3, 1951     G. A. LYON     2,547,275
METHOD OF AND APPARATUS FOR
MAKING PLASTIC WHEEL TRIM
Filed Dec. 28, 1945     2 Sheets-Sheet 1
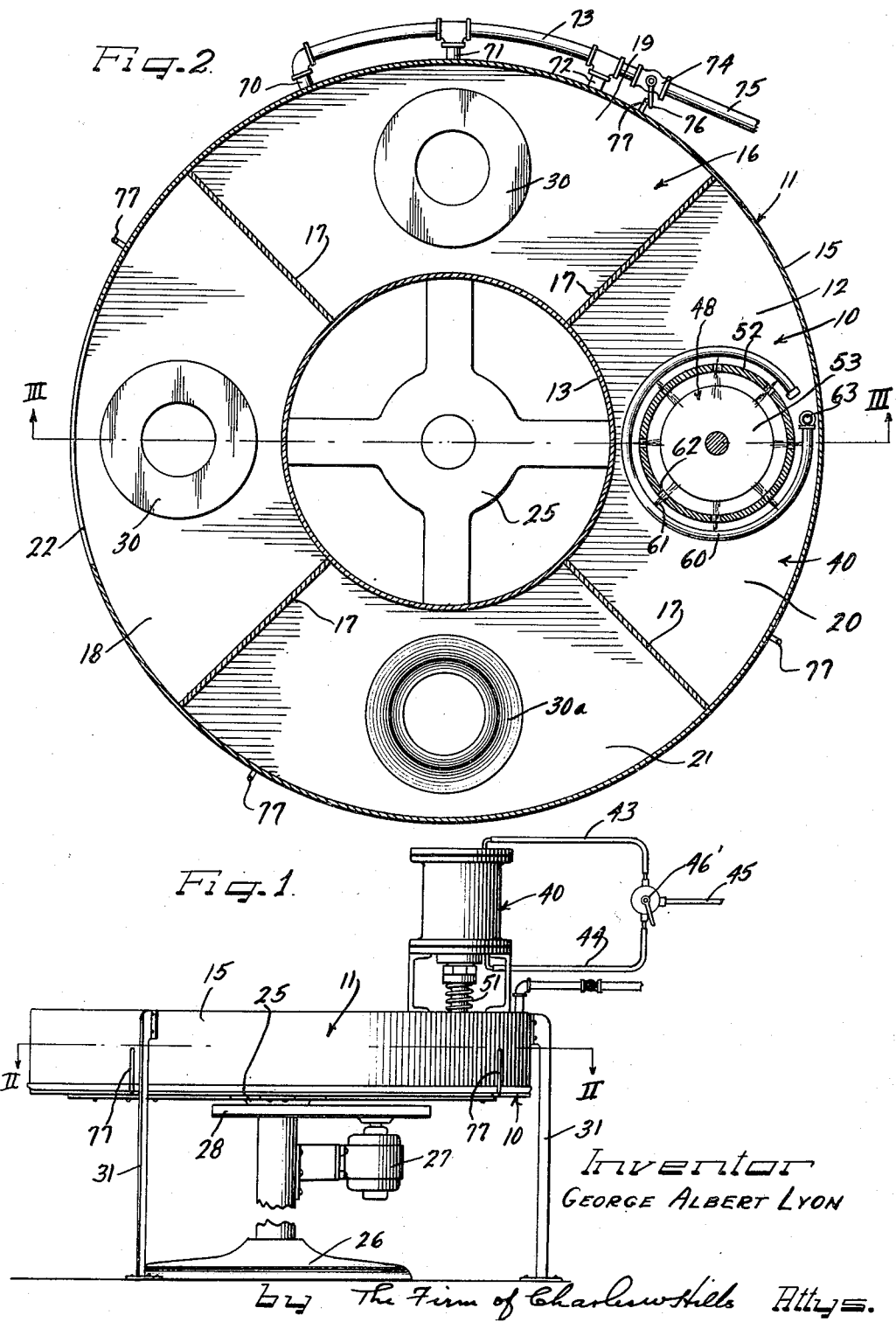
Inventor
GEORGE ALBERT LYON
by The Firm of Charles W. Hills Attys.

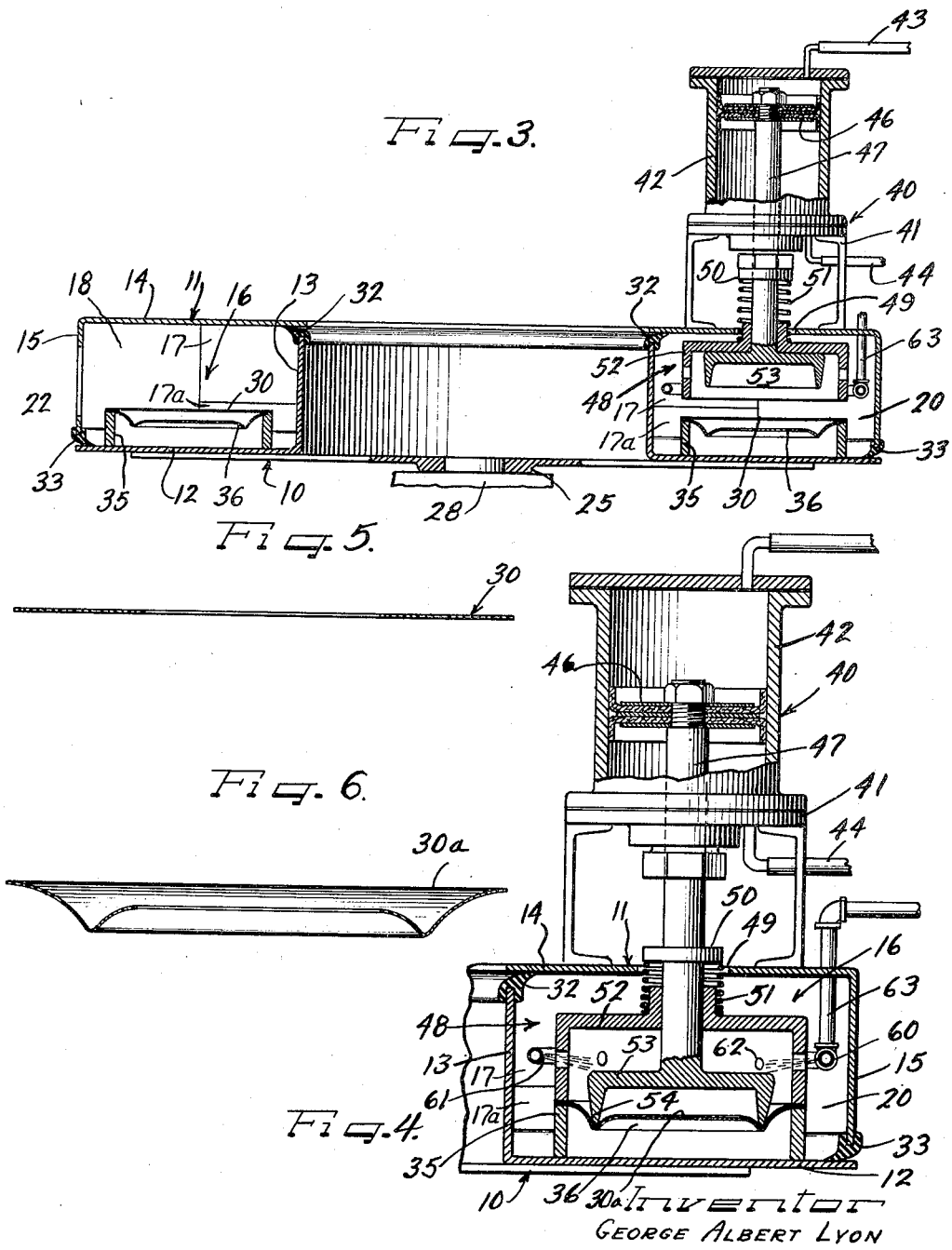

Patented Apr. 3, 1951

2,547,275

UNITED STATES PATENT OFFICE 2,547,275

METHOD OF AND APPARATUS FOR MAKING PLASTIC WHEEL TRIM

George Albert Lyon, Allenhurst, N. J.

Application December 28, 1945, Serial No. 637,668

10 Claims. (Cl. 18—19)

This invention relates to a method of and apparatus for forming plastic, and more particularly to the progressive forming of plastic pieces through the indexing of the same through progressive work stations.

An object of this invention is to provide an improved and simplified method of and apparatus for forming plastic articles, such, for example, as circular dished members adapted for use as automobile wheel trim or the like.

Another object of this invention is to provide a compact plastic forming apparatus wherein the operations on a piece of plastic may be progressively accomplished on a table adapted to be indexed about a common axis.

Yet another object of this invention is to provide a plastic forming apparatus wherein the plastic is formed in an annular area, defined on one side by a rotatable table and on the other by a stationary cover carrying plastic pressing means.

In accordance with the general features of this invention, there is provided in a plastic forming machine, a rotatable table formed to carry pieces of plastic to be treated, a stationary cover cooperable with the table to define therewith a plurality of work compartments including at least a heating station and a pressing station, means for indexing the table to progressively advance each piece of work through the stations so that each piece is first heated to make same flowable before being advanced to the pressing station; the pressing means including a platen carried by the cover and movable downwardly against the table during a period of dwell for bending and shaping the heated pieces of plastic.

Other features relate to the manner in which the cover is sealingly engaged with the table and to the construction of work supports on the table, each of which is cooperable with the press platen means at the pressing station and so as to serve as the lower platen.

Other features relate to the manner in which the platen means on the cover engages and shapes the pieces of plastic therebelow carried by the table.

Other objects and features of this invention will more fully appear from the following detailed description taken in connection with the accompanying drawings which illustrate a single embodiment thereof and in which:

Figure 1 is a side view of an apparatus embracing the features of this invention and for practicing my novel method of forming plastic;

Figure 2 is an enlarged cross-sectional view taken on the line II—II of Figure 1 looking downwardly;

Figure 3 is a fragmentary vertical sectional view taken on the line III—III of Figure 2 lookin the direction indicated by the arrows, and showing the platen means in its uppermost or disengaged position;

Figure 4 is a fragmentary sectional view corresponding to an enlargement of the right hand portion of Figure 3, but showing the platen means in the act of pressing a piece of plastic to the desired configuration;

Figure 5 is a cross-sectional view through a plastic annulus prior to the shaping of the same; and Figure 6 is a cross-sectional view through the same piece of plastic after it has been subjected to the operations of my novel method.

As shown on the drawings:

It is believed that my novel method will be best understood from a description of an apparatus for practicing the same.

The reference character 10 designates generally a rotatable circular table which is of an annular cross-sectional shape. The table 10 is cooperable with a stationary circular cover 11, which like the table, is of annular cross-sectional shape. More specifically, the table includes horizontal and vertical legs 12 and 13 (Figure 3), and the cover 11 includes horizontal and vertical legs 14 and 15 opposite the legs of the table. The legs of the table and cover cooperate to define an annular chamber 16, divided into a plurality of compartments which, as best shown in Figure 2, may be four in number.

It will be noted from Figure 2 that the vertical leg 13 of the table and the vertical leg 15 of the cover are circular and are concentrically arranged about a common axis. The central or vertical leg 13 of the rotatable table has secured to it four upright partition walls 17a, which cooperate with four fixed partition walls 17 secured to the cover 11 and which walls together divide the chamber 16 into a charging station 18, a heating station 19, a pressing station 20 and a cooling station 21. Material is delivered into the charging station 18 through an opening 22 formed in the vertical wall 15 of the rigid cover.

Tht table 10 is carried by a central spider 25 (Figures 2 and 3), which is in turn rotatably carried by a central standard 26. The table is adapted to be driven through the spider by means of a motor 27 connected to the spider by any suitable or conventional indexing mechanism designated generally by the reference character 28. This indexing mechanism may take the form of a Geneva movement or the like. In other words, the drive for the table is so set and adjusted as to index the table at regular predetermined intervals. It is during the periods of dwell that work is adapted to be progressively performed on the advancing pieces of plastic, which are designated generally by the reference character 30.

The stationary cover 11 is held in a rigid position by a plurality of vertical legs 31, which may be of any suitable number, such, for example, as three (Figure 1). These legs firmly anchor the cover 11 to the floor, or other support.

I find it desirable for efficient operation to sealingly engage the cover with the table. I accomplish this by fastening a rubber bead 32 to the upper edge of the vertical table wall 13 (Figures 3 and 4). This bead is of a flap type and is adapted to resiliently engage and drag along the undersurface of the cover leg 14. This seals the annular compartment 16 at the inner side. The outer side of the annular compartment 16 is sealed by a similar rubber bead 33 secured to the lower edge of the vertical cover wall 15 and adapted to engage the top surface of the horizontal table leg 12.

Secured to the table 10 in each of the compartments 18, 19, 20 and 21, is a work piece support 35. In order words, there is one work piece support for each of the four stations. These supports are all identical in construction. Each one comprises an annular ring suitably secured to the top surface of the table leg 12, and which ring is of such a diameter as to engage and support the outer edge of a dished pan-like platen 36. This platen 36 may be made of light polished sheet metal and is supported at its outer edge by an edge of the flange ring 35 so that the dished portion of the pan projects downwardly inside of the supporting ring 35. In reality, this pan 36, together with the supporting ring constitutes the lower platen of a press to be hereinafter described when the support is inside of the work performing or pressing station 20.

It will also be noted that the diameter of the supporting ring 35 and the pan 36 is such that the edge of the flat annular plastic ring 30 may be supported thereon in a position to be deflected downwardly against the dished surface of the pan 36. In the illustrated embodiment of the invention, the cross-sectional configuration of the pan 36 is such as to enable the flat ring 30 when deflected thereagainst to be formed into a dished annular wheel trim ring, such as the ring 30a, shown in section in Figure 6.

Any suitable plastic material may be used, such, for example, as ethyl cellulose, cellulose acetate and vinyl resins. Then, too, while my invention is adapted for the treatment of plastic pieces, it, of course, is useful in connection with the treatment of pieces made from other types of material and of different shapes than that illustrated.

At the press or work performing station there is provided a hydraulic press designated generally by the reference character 40 and which is carried by the stationary cover 11 (Figures 3 and 4). This press includes a supporting base 41 on which is carried a hydraulic or fluid cylinder 42 having its end in communication with fluid pipe lines 43 and 44 connected to a fluid pressure line 45 (Figure 1) through a control valve 46'. This valve 46' may be of any suitable construction and is so designed as to switch the fluid under pressure to either the top or lower sides of the cylinder 42 for moving back and forth a piston 46 (Figure 4) in the cylinder 42.

The piston 46 may be of any suitable or conventional construction and is connected to a ram rod 47, the lower end of which carries an annular platen assembly 48 located inside of the annular chamber 16 at the work performing station 20. This ram rod 47 projects through an opening 49 in the top leg 14 of the cover 11, and has a flange-like shoulder 50 disposed above the opening 49. Between the shoulder 50 and the top of the platen assembly 48 is a compressible spring 51.

The platen assembly 48 includes two concentric flanged annular members, namely, an outer downwardly dished member 52 through which the rod 47 is slidable and a downwardly cupped annular member 53 attached directly to the lowermost end of the rod 47 inside of the flange of the outer cup member 52. It is between the member 52 and the shoulder 50 that the spring 51 is positioned.

This arrangement is such that upon downward movement of the piston rod 47 from the position shown in Figure 3, the lower edge of the cupped member 52 engages the peripheral edge of the plastic ring 30 to clamp the same tightly against the outer edge of the platen or pan 36, as shown in Figure 4. Thereafter continued movement of the rod 47 downwardly results in the rod sliding through the outer member 52, compressing the spring between the shoulder 50 and the member 52 and forcing the inner cupped member 53 downwardly against an annular intermediate portion of the plastic ring 30.

Only the annular edge 54 of the inner inverted cup member 53 contacts the plastic piece but this contact is sufficient to deflect the previously heated plastic ring against the polished platen or pan 36. In this manner the plastic piece 30 can be formed to the configuration of the dished pan 36. In other words, the flat piece 30 is thus formed into the dished piece 30a.

After the plastic piece 30 has been thus deflected from the position shown in Figure 3 to that shown in Figure 4, it is momentarily held in this deflected condition so that cooling fluid can be introduced in the platen 48 for the purpose of causing the plastic to take a set. Any suitable cooling arrangement can be employed for this purpose. I have in Figures 2 and 4 illustrated one form of cooling device which comprises a split annular pipe or tube 60 having a plurality of nozzle openings 61 positioned to discharge directly through holes 62 into the interior of the hollow platen member 52. The split ring 60 is connected to a source of fluid through a pipe 63 extending through an opening in the top leg 14 of the cover 11. Suitable valve mechanism (not shown) may be provided for controlling the flow of cooling fluid into the station 20. If water is employed, any suitable drain (not shown) may be provided for allowing the water to leave the annular chamber 16.

Thereafter upon reversal of the hydraulic pressure in the cylinder 42, the piston moves upwardly raising the platen member 53 off the formed plastic ring and the previously compressed spring 51 is effective to likewise urge the two members 52 and 53 toward each other so that they can be raised from the position shown in Figure 4 to the uppermost position shown in Figure 3.

The table 10 is then indexed to carry the formed plastic ring 30a from the forming station 20 to a further cooling station 21 (Figure 2).

While the ring 30a is being cooled at the station 21, another ring is being formed at the station 20.

Now, as I have indicated before, it is desirable to preheat the plastic ring 30 prior to the forming operation. This preheating could be accomplished elsewhere than in the chamber 19 although I preferably provide for the heating of the same in the chamber itself (Fig. 2).

Such a heating station is provided at the compartment area 19 between the partitions 17—17, defining this compartment in the annular chamber 16. More specifically, the stationary wall or leg 15 of the cover 11 carries a plurality of steam nozzle jets 70, 71 and 72, discharging directly into the chamber 16 and connected to a common steam pipe line 73. This pipe line 73 is connected through a control valve 74 to a supply line 75.

The valve 74 could be manually controlled although in the illustrated embodiment it is automatically controlled. This is accomplished by a handle 76 on the valve positioned to be intermittently engaged by abutments 77 carried by the rotatable table 10. It will be noted from Figures 1 and 2 that three of these vertical abutments 77 extend upwardly from the table alongside of the rigid cover wall 15. As the table is rotated these abutments are adapted to progressively strike the spring urged handle 76 to open the valve 74 and allow steam to enter the heating chamber 16.

After an abutment 77 has passed the valve handle 76, this handle may be returned to its initial position by a spring (not shown) in the valve. Such a spring valve is well known in the valve art.

In the operation of the apparatus, the piece of plastic 30 is introduced through the opening 22 (Figure 2) in the charging station 18, and is placed upon the platen or pan 36 in the position shown in Figure 3. Then the table 10 is indexed to the right (Figure 2) so as to bring the supported piece of plastic into the heating area 16 where steam is applied to heat the plastic and render it flowable for forming. While this is taking place another piece of plastic is introduced at the charging station 18.

After heating the table 10 is indexed again by the Geneva movement 28, thus bringing the heated piece of plastic into the forming station 20 and bringing another piece of plastic into the heating chamber 19. During the forming operation described a further piece of plastic 30 is introduced in the charging station 18.

After the forming operation, the Geneva movement 28 again indexes the table, bringing the formed ring 30a into the cooling chamber 21. The fourth piece of plastic is then introduced in the charging station 18 so that at that time the table is carrying four pieces of plastic, which is the normal charge for the annular chamber 16.

Upon a further indexing of the table the formed and cooled piece 30a is delivered back to the charging station 18 where it can be removed through the opening 22 and replaced by a new piece of plastic 30. In this manner, the illustrated apparatus continuously turns out one formed piece 30a every time a new piece 30 is introduced through the opening 22 in the annular chamber 16.

I claim as my invention:

1. In a forming machine, a rotatable table formed to carry pieces of work to be formed, a stationary cover and partitions cooperable with said table to define therewith a plurality of work compartments including a heating station and a pressing station, means for indexing said table to progressively advance said pieces through said stations whereby each piece is heated to render same flowable before being advanced to said pressing station, platen means carried by said cover at said pressing station for bending each heated piece into a predetermined cross sectional configuration, said platen means including an outer circular member movable downwardly to hold the piece against a surface on the table and an inner movable member for deflecting the piece downwardly against and in conformity with said surface.

2. In a forming machine, a rotatable table formed to carry pieces of work to be formed, a stationary cover and partitions cooperable with said table to define therewith a plurality of work compartments including a heating station and a pressing station, means for indexing said table to progressively advance said pieces through said stations whereby each piece is heated to render same flowable before being advanced to said pressing station, platen means at said pressing station for bending each heated piece into a predetermined cross sectional configuration, said cover carrying a source of heating means and a valve for controlling the flow of the same and said table carrying means for tripping said valve to open the same in response to the indexing of the table.

3. In a forming machine, a rotatable table formed to carry pieces of work to be formed, a stationary cover and partitions cooperable with said table to define therewith a plurality of work compartments including a heating station and a pressing station, means for indexing said table to progressively advance said pieces through said stations whereby each piece is heated to render same flowable before being advanced to said pressing station, platen means carried by said cover at said pressing station for bending each heated piece into a predetermined cross sectional configuration, said platen means including an outer circular member movable downwardly to hold the piece against a surface on the table and an inner movable member for deflecting the piece downwardly against and in conformity with said surface, and cooling means for directing fluid between said outer and inner members for cooling and setting the piece after the forming operation.

4. In combination in apparatus for making plastic wheel trim or the like, means for supporting the thin plastic sheet blank and including a forming surface of the contour which the blank is to assume, means for heating the blank on said surface, forming means including successively operable clamping and pressing members for respectively clamping the blank in place with respect to said surface and thereafter pressing the blank against the surface, and means operable after the pressing member has pressed the blank against said surface to impinge jets of cooling medium upon the pressing member to effect a set of the formed plastic blank, the blank clamping member being in the form of an inverted cup-shaped device having a series of apertures in the annular wall thereof through which said cooling jets are adapted to be directed.

5. In combination in apparatus for making plastic wheel trim or the like, a forming table of substantially L-shape cross section adapted to be rotated and comprising an annular wall disposed vertically and a horizontal wall for supporting forming apparatus, a cover structure of substantially L-shape cross section including a horizontal wall spaced above and substantially coextensive with said horizontal table portion and a vertical annular wall in radially spaced relation to and substantially vertically coextensive with the annular wall of the table, and means between the margins of the respective vertical annular walls and the horizontal wall portions of the table and the cover structure affording a sealed relationship therebetween permitting relative rotary movement of the cover and table structures.

6. The method of making a plastic wheel trim of circular form and concentrically grooved to provide radially inner and radially outer divergently related portions, which comprises supporting a flat softened sheet blank of plastic material on an annularly grooved forming surface having divergent areas with the juncture thereof providing the bottom of the annular forming groove in said surface, engaging the blank in an area limited to a circular line concentric with and substantially of the same diameter as the groove bottom and with substantial areas of the blank radially outwardly and radially inwardly from said line remaining free from engagement, and pressing against the blank on said limited circular line area until the engaged circular portion of the blank bottoms in said forming groove and said radially outer and radially inner areas of the blank follow to the divergent areas of the forming surface free from any direct pressure engagement thereagainst.

7. In a forming machine, a rotatable table formed to carry pieces of work to be formed, a stationary cover and partitions cooperable with said table to define therewith a plurality of work compartments including a heating station and a pressing station, means for indexing said table to progressively advance said pieces through said stations whereby each piece is heated to render same flowable before being advanced to said pressing station, said cover carrying a source of fluid heating medium and a valve for controlling the flow of the heating medium, and means on the table for tripping said valve to open the same as an incident to indexing of the table.

8. In combination in apparatus of the character described, a material forming enclosure comprising a table member of substantially L-shape cross section, an annular cover member of substantially L-shape cross section, said members being cooperatively related with the horizontal and vertical legs thereof in spaced parallelism, one of said members being rotatable relative to the other of said members, and a plurality of partitions dividing the interior of the enclosure formed by said members into a plurality of separate stations in which the material to be worked on is successively received.

9. In combination in apparatus of the character described, a material forming enclosure comprising a table member of substantially L-shape cross section, an annular cover member of substantially L-shape cross section, said members being cooperatively related with the horizontal and vertical legs thereof in spaced parallelism, one of said members being rotatable relative to the other of said members, and a plurality of partitions dividing the interior of the enclosure formed by said members into a plurality of separate station compartments in which the material to be worked on is successively received, one of the vertical parallel legs having an access opening therein for loading and unloading the material to be worked on with respect to one of the compartments.

10. In combination in apparatus for forming a wheel trim from thermo-plastic sheet material, means defining a forming surface having annular divergently related forming surface areas joined by an annular juncture groove, means for clamping a heated and softened sheet of thermo-plastic material marginally about the perimeter of the radially outer of said forming surface areas and with the sheet overlying the forming surface, and a pressing member having an annular pressing edge disposed concentric with and substantially complementary to said juncture groove and having means for pressing said edge against the sheet of thermo-plastic material while the sheet is being held over said forming surface to drive the sheet against the forming surface, said forming edge being dimensioned to engage only a limited annular area of the plastic sheet throughout engagement of the edge with the sheet and even when the sheet has been pressed thereby against the forming surface leaving the areas of the sheet radially inwardly and radially outwardly of the annular engaged area of the sheet entirely free to find their own position against the diverging surface areas of the forming surface.

GEORGE ALBERT LYON.

REFERENCES CITED

The following references are of record in the file of this patent:

UNITED STATES PATENTS

| Number | Name | Date |
|---|---|---|
| 483,653 | Jefferson | Oct. 4, 1892 |
| 485,300 | Rudd | Nov. 1, 1892 |
| 1,259,459 | Stile | Mar. 12, 1918 |
| 1,525,629 | Thompson | Feb. 10, 1925 |
| 1,537,697 | Roberts | May 12, 1925 |
| 1,544,573 | Glasner et al. | July 7, 1925 |
| 1,633,028 | La France | June 21, 1927 |
| 1,636,111 | Rode | July 19, 1927 |
| 1,671,577 | Gluckin et al. | May 29, 1928 |
| 1,768,768 | Johnson | July 1, 1930 |
| 1,903,909 | Cope et al. | Apr. 18, 1933 |
| 2,247,270 | Bair | June 24, 1941 |
| 2,317,597 | Ford et al. | Apr. 27, 1943 |
| 2,357,806 | Borkland | Sept. 12, 1944 |
| 2,388,986 | Morin | Nov. 13, 1945 |